United States Patent
Salice

(10) Patent No.: US 6,615,450 B2
(45) Date of Patent: Sep. 9, 2003

(54) APPARATUS FOR THE DAMPING OF IMPACTS, PREFERABLY THE IMPACTS OF FURNITURE DOORS OR DRAWERS

(75) Inventor: Luciano Salice, Carimate (IT)

(73) Assignee: Arturo Salice S.p.A., Novedrate (Como) (IT)

( * ) Notice: Subject to any disclaimer, the term of this patent is extended or adjusted under 35 U.S.C. 154(b) by 0 days.

(21) Appl. No.: 09/875,167

(22) Filed: Jun. 7, 2001

(65) Prior Publication Data
US 2002/0010977 A1 Jan. 31, 2002

(30) Foreign Application Priority Data
Jun. 8, 2000 (DE) .......................................... 200 10 282

(51) Int. Cl.[7] .................................................. E05F 5/06
(52) U.S. Cl. ............................ 16/85; 188/129; 188/381
(58) Field of Search ....................... 16/85, 82; 188/266, 188/267, 129, 381; 267/64; 92/165 R

(56) References Cited

U.S. PATENT DOCUMENTS

| 2,316,924 A | * | 4/1943 | Whisler ...................... 188/317 |
| 2,599,477 A | * | 6/1952 | Patriquin .................... 188/284 |
| 2,705,633 A | * | 4/1955 | Potter, Jr. .................. 267/211 |
| 2,752,149 A | * | 6/1956 | Focellini .................... 267/202 |
| 2,997,291 A | * | 8/1961 | Stultz ........................ 267/64 |
| 3,161,908 A | * | 12/1964 | Walach .......................... 16/52 |
| 3,682,461 A | * | 8/1972 | Wachenheim ................ 267/31 |
| 3,806,105 A | * | 4/1974 | Konishi et al. ............. 267/116 |
| 4,030,715 A | * | 6/1977 | Duran ...................... 267/64 R |
| 4,328,960 A | * | 5/1982 | Handke et al. ............. 267/226 |
| 4,505,458 A | * | 3/1985 | Schultz ...................... 267/209 |
| 4,817,238 A | * | 4/1989 | Liu .............................. 16/66 |
| 4,863,147 A | * | 9/1989 | Loeber et al. ........... 267/64.26 |
| 4,949,143 A | * | 8/1990 | Iesaka et al. ............... 257/220 |
| 5,080,204 A | * | 1/1992 | Bauer et al. ................ 188/129 |
| 5,295,564 A | * | 3/1994 | Stadelmann ................ 188/381 |
| 5,477,589 A | * | 12/1995 | Lan .............................. 16/51 |
| 5,535,861 A | * | 7/1996 | Young ........................ 188/381 |
| 5,927,448 A | * | 7/1999 | Yamazaki ................... 188/281 |
| 6,006,873 A | * | 12/1999 | Kirst .......................... 188/287 |
| 6,205,619 B1 | * | 3/2001 | Jang ............................ 16/352 |
| 6,260,832 B1 | * | 7/2001 | Vignocchi et al. ....... 267/64.15 |

FOREIGN PATENT DOCUMENTS

TW          86220518         4/1999

* cited by examiner

Primary Examiner—Anthony Knight
Assistant Examiner—Lisa Bannapradist
(74) Attorney, Agent, or Firm—Jacobson Holman PLLC

(57) ABSTRACT

An apparatus for the damping of impacts, preferably the impacts of furniture doors or drawers, consists of a cylinder with a piston whose piston rod sealingly guided out of a cylinder side forms a ram absorbing the impacts which divides the cylinder space filled with a liquid into two chambers and has perforations and/or, together with the cylinder wall, bounds a passage gap. A guide bushing guiding the piston rod is arranged in the region of the discharge end of the cylinder. A compression spring is clamped between the piston and the cylinder bottom. To ensure a smooth and quiet running with a compact construction, the guide bushing has a central shaft part of reduced diameter. A widened end part of the guide bushing is supported on a step or annular flange constricting the inner diameter of the cylinder and the guide bushing is supported at the other end on a cover closing the cylinder. The shaft part of the guide bushing is encompassed by a tube-section-like part made of elastic material.

14 Claims, 3 Drawing Sheets

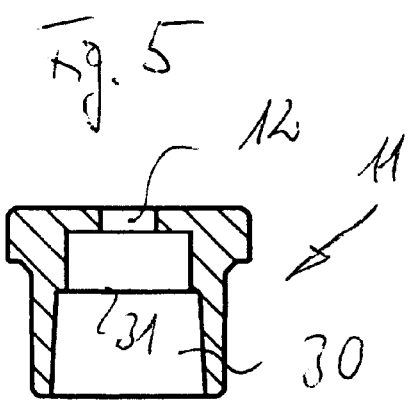
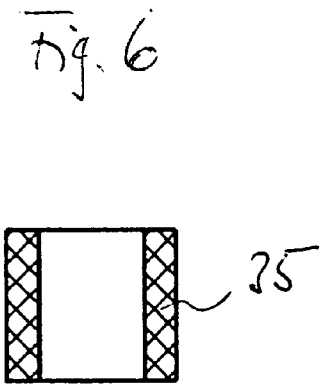
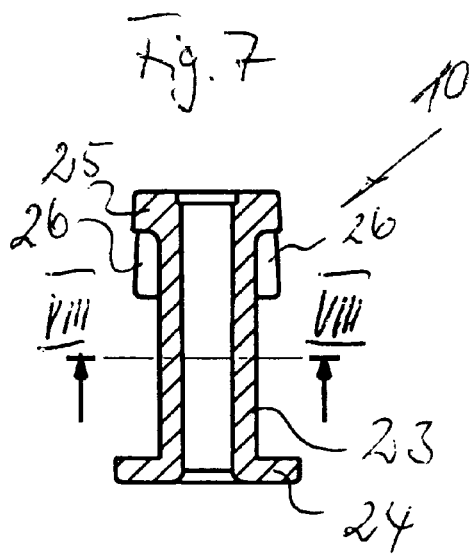
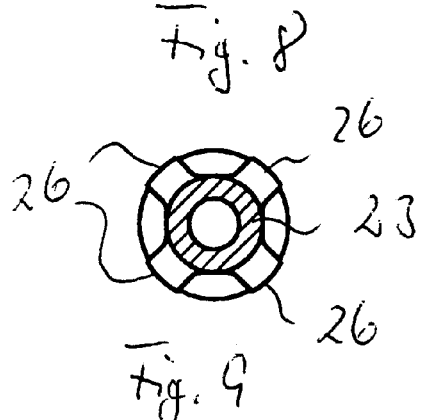
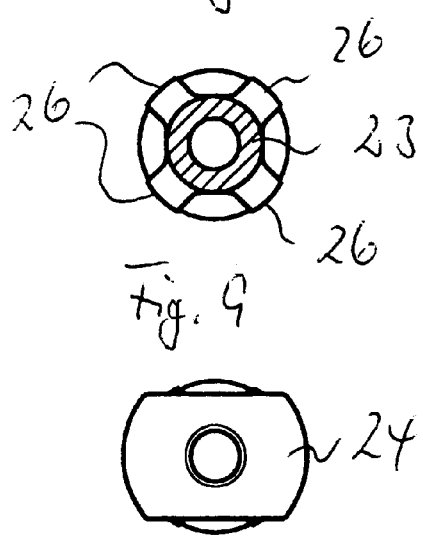
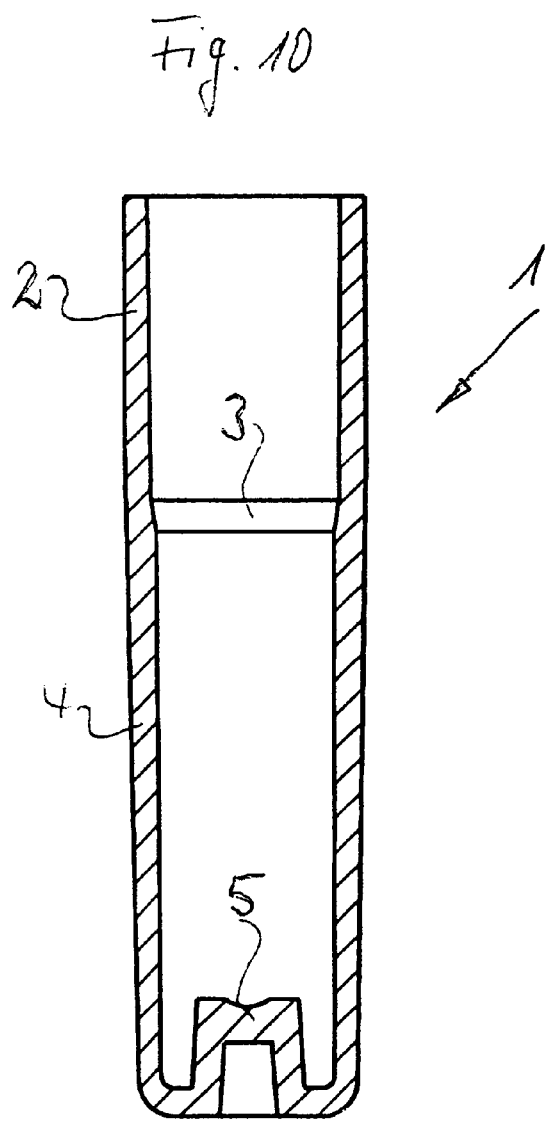

APPARATUS FOR THE DAMPING OF IMPACTS, PREFERABLY THE IMPACTS OF FURNITURE DOORS OR DRAWERS

BACKGROUND OF THE INVENTION

1. Field of the Invention

The invention relates to an apparatus for the damping of impacts, preferably the impacts of furniture doors or drawers, consisting of a cylinder with a piston whose piston rod sealingly guided out of a cylinder side forms a ram absorbing the impacts which divides the cylinder space filled with a liquid into two chambers and has perforations and/or, together with the cylinder wall, bounds a passage gap, of a bushing arranged in the region of the outlet end of the cylinder and guiding the piston rod, and of a compression spring clamped between the piston and the cylinder bottom.

2. Description of the Related Art

Damping apparatuses of this kind have either a complicated construction or they are large in dimension or they do not guarantee a smooth and quiet running. Rough running and irritating noises can be caused in particular by the air bubbles present in the damping liquid.

SUMMARY OF THE INVENTION

It is therefore the object of the invention to provide a damping apparatus of the kind first given which ensures a smooth and quiet running with a construction which is as compact as possible.

In accordance with the invention, this object is solved in a damping apparatus of the kind initially given by the bushing having a central shaft part of reduced diameter and by a widened end part thereof being supported on a step or an annular flange constricting the inner diameter of the cylinder and, the other end being supported on a cover closing the cylinder and by the shaft part being enclosed by a tube-section-like part made of elastic material.

The damping apparatus in accordance with the invention can be made in a small and compact construction due to its parts to be dimensioned. The tube-section-like part made of elastic material is located in the cylinder chamber on the piston rod side in which the air bubbles collect without interference in a dead space. The air bubbles can also be absorbed without interference by the tube-section-like part which simultaneously forms a storage bush.

The tube-section-like part forming the storage bush can consist of cellular rubber or foam rubber or of foamed elastomer plastic. It should preferably have closed cells so that it can be highly compressed.

The cover appropriately consists of a bush-shaped part with a borehole in its bottom for the passage of the piston rod and with a flange-shaped edge via which the cover is supported on the annular end face of the cylinder. To connect the cover to the cylinder, the two can, if they consist of plastic, be connected by an ultrasonic welding connection. The connection can naturally also be made in any other manner, for example by adhesive bonding.

The bushing can be supported on the cover with a part widening the shaft part. Appropriately, the bushing grips into the cover with a frusto-conically shaped widening part. The widening part of the bushing can also be supported on an annular step of the inner space of the cover.

In another aspect of the invention, it is provided that an annular lip seal is held between the bottom of the cover and the annular end face of the bushing, said lip seal preventing a discharge of the liquid, preferably oil.

In another aspect of the invention, it is provided that the bushing is provided with radial ribs at its end region at the cover side. The tube-section-like storage bush is then supported on axially extending ends of these ribs so that a storage space for any air bubbles is formed between the ribs.

The lower widened part of the bushing can be provided with perforations or sections which bound the passage gap together with the cylinder wall.

Appropriately, the piston rod in the cylinder is provided with a flat head with which it is supported on the piston. The piston itself is provided with perforations or bounds a ring gap together with the cylinder wall.

The piston preferably has a transversely extending groove with an axial borehole in its end face facing the piston rod, which opens into a widened axial borehole. The piston can be provided with at least one radial borehole which connects the axial borehole to a widened piston section. Furthermore, the piston can be reduced in its diameter on its side facing the cylinder bottom so that a seating is formed for the compression spring.

In another embodiment of the invention, it is provided that the piston has an annular groove between its end face and its widened part and that a slit ring is inserted into the annular groove. This slit ring is expanded under the pressure of the damping liquid and then improves the guiding of the piston in the cylinder, with the expanded slit then forming an additional constricting passage for the damping liquid.

BRIEF DESCRIPTION OF THE DRAWINGS

An embodiment of the invention is explained in more detail below by means of the drawing which shows:

FIG. 5   a longitudinal section through the cover;
FIG. 6   a longitudinal section through the tube-section-like part made of porous and elastic material;
FIG. 7   a longitudinal section through the guide bushing of the piston rod;
FIG. 8   a section through the guide bushing along the line VIII-VIII in FIG. 7;
FIG. 9   a bottom view of the guide bushing in accordance with FIG. 7;
FIG. 10   a longitudinal section through the cylinder.

DETAILED DESCRIPTION OF THE PREFERRED EMBODIMENTS

Figure 1:
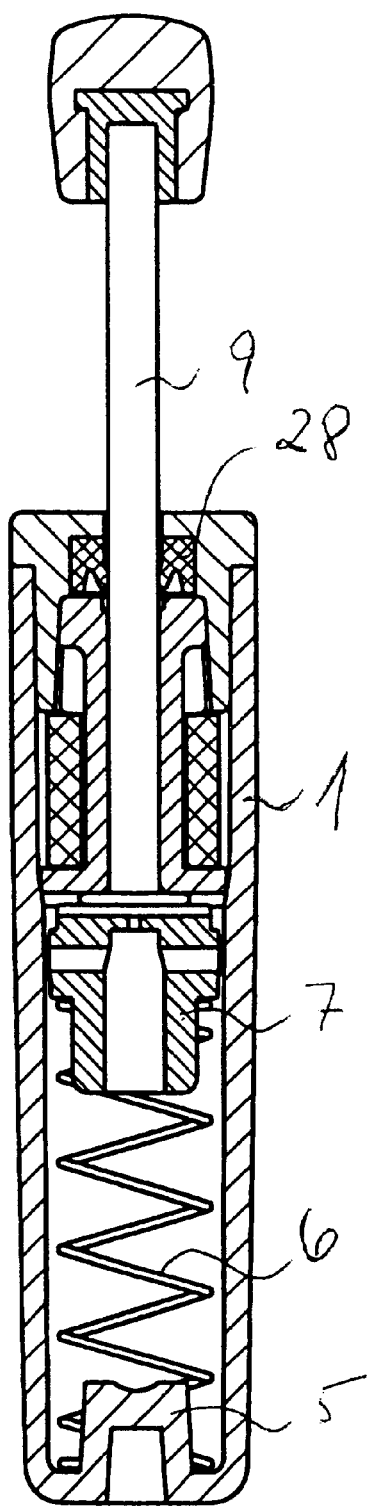
FIG. 1   a longitudinal section through a first embodiment of the damping apparatus, in which the piston is in its upper end position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The damping apparatus in accordance with FIGS. 1 to 10 consists of a bush-shaped cylinder 1 made of metal or of an injection-molded part made of plastic which has a section 2 with a larger diameter at its open end, said section 2 merging via a chamfered annular step 3 into a section 4 with lower diameter. The bush-shaped cylinder is closed at its bottom and is provided with a pedestal 5 projecting from the bottom which forms a retaining part for a compression spring 6. A displaceable piston 7 is arranged in the cylinder section 4 with a lower diameter and its upper end surface is supported on a flat head 8 which is arranged at the inner end of the piston rod 9. The piston rod 9 is guided in a guide bushing 10 which is supported in a bush-like cover 11 which closes the cylinder 1. The piston rod 9 exits to the outside through a borehole 12 of the cover 11 and carries a cap 13 fixedly connected thereto made of soft or elastic material at its free end.

The piston 7 has an annular section 15 of a larger diameter at which a section 16 of reduced diameter connects via an annular step, said section 16 serving to hold the upper end of the compression spring 6. The annular section 15 can be formed in a slightly conical shape in the manner visible from the drawing. A section of short length with a lower diameter also follows on above the annular section 15. This section is provided at its upper side with a smooth end surface 17 which is provided with a groove 18 on a diameter line. This groove 18 is provided in its central region with an axial borehole 19 which opens into an expanded borehole section 20 of the piston 7. The piston is provided in the region of the widened section 15 with coinciding radial boreholes 21 which open into the axial borehole 20 expanded in diameter.

The guide bushing 10 for the piston rod 9 consists of a central tubular shaft part 23 which has a flange-shaped widening 24 at its lower end. At its upper end, the guide bushing 10 is provided with a somewhat frusto-conically shaped widened part 25. Freely leading out radial ribs 26 follow on at the upper widened frusto-conically shaped section 25 as can be seen from FIGS. 7 and 8.

The lower flange-shaped part 24 of the guide bushing 10 is provided with free cuts opposite one another, by which circular segments are separated, as can be seen from FIG. 9.

The upper frusto-conically shaped part of the guide bushing 10 grips into a complementary borehole 30 of the cover 11 and is supported in this on an annular step 31. An annular lip seal 23 is inserted in the manner visible from FIGS. 1 and 2 between the upper annular end surface of the guide bushing 10 and the bottom of the cover 11 provided with the borehole 12.

A tubular section part 35 made of highly compressible elastic material encompasses the section of the shaft 23 of the guide bushing 10 between the lower flange-shaped part 24 and the axially-extending radial ribs 26.

In the embodiment in accordance with FIGS. 11 to 14, the piston 40 is provided with an annular groove 41 between these widening sections, with radial boreholes 42 opening into the base of this annular groove 41 which connect the annular groove to the central borehole 20. A ring 44, which is made of elastic material and which is provided with an obliquely extending slit 43, is inserted into the annular groove 41.

In the damping apparatus in accordance with the invention, the bushing 10 serving the guidance of the piston rod 9 is therefore supported with its flange 24 expanding the diameter on a wedge-shaped annular step 3 of the inner cylinder wall at the one end and with a likewise expanded, frusto-conically shaped end region in a complementary recess of the cover 11 at the other end. The frusto-conically shaped end region 25 of the bushing 10 is provided with ribs which lead out freely into the inner space of the cylinder. The tube-section-like part 35 is arranged between these ribs and the annular flange of the bushing.

For the mounting of the damping apparatus, first the cylinder 1 is filled with a damping liquid, for example oil, in the required amount. Subsequently, the compression spring 6 and the piston 7, 40 are inserted. Then the bushing encompassed by the tube-section-like part 35 is inserted together with the piston rod, the cover and the annular lip seal, with the cover being connected to the cylinder, for example by ultrasonic welding. Since the cover contacts the cylinder jacket, any air bubbles are held back in the recesses between the radial ribs 26 of the guide bushing 10.

Figure 2:
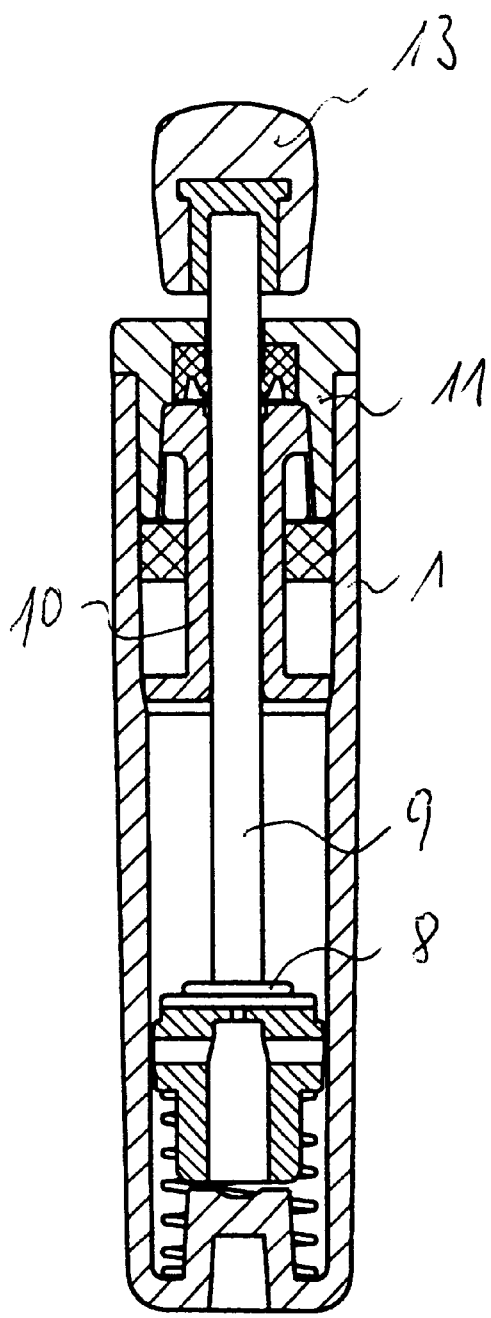
FIG. 2   a representation corresponding to FIG. 1 in which the piston is in the lower end position of the cylinder.
Figure 11:
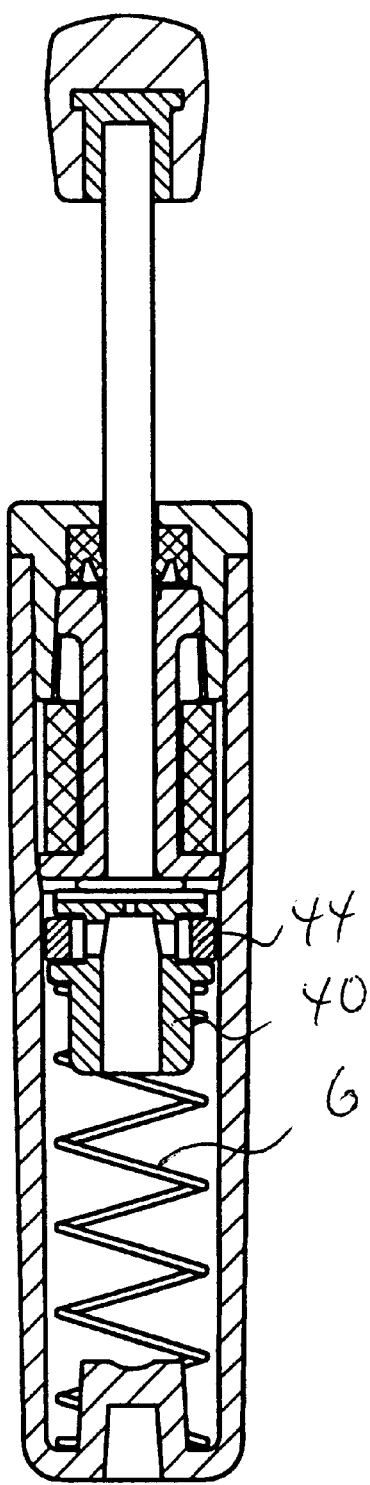
FIG. 11   a longitudinal section through a second embodiment of the damping apparatus.
Figure 3:
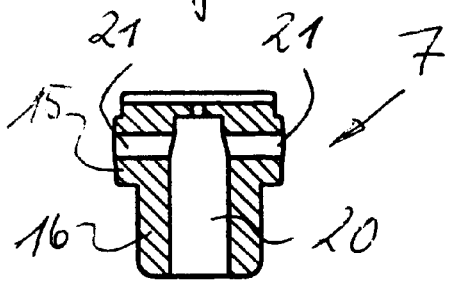
FIG. 3   a longitudinal section through the piston.
Figure 4:
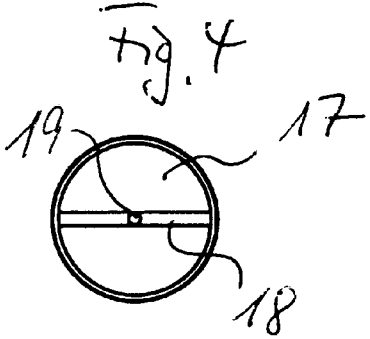
FIG. 4   a plan view of the piston in accordance with FIG. 3.
Figure 12:
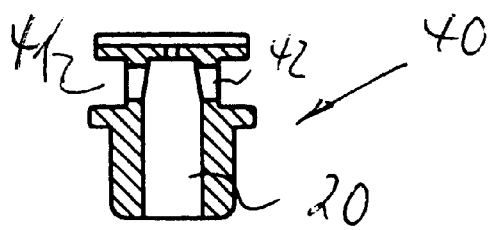
FIG. 12   a longitudinal section through the piston of the damping apparatus in accordance with FIG. 7.
Figure 13:
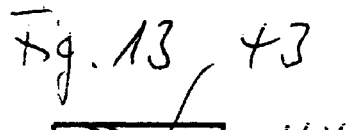
FIG. 13   a side view of a slit ring which is inserted into an annular groove of the piston in accordance with FIG. 12.
Figure 14:
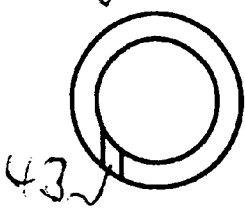
FIG. 14   a plan view of the slit ring in accordance with FIG. 13.

If oil flows into the cylinder space at the piston-rod side when the piston rod is pressed in, the tubular section part 35 is compressed in the manner visible from FIG. 2. In this process, no path is provided to release any air bubbles present between the radial ribs so that the functional capability of the damping apparatus cannot be impaired by these air bubbles.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An apparatus for damping impacts of furniture doors or drawers comprising:
    a cylinder having an open end and a closed end and divided into two chambers by a conically-shaped annular flange constricting the inner diameter of the cylinder such that the chamber at the closed end has a smaller diameter than the chamber at the open end;
    a piston in the closed end of the cylinder and having a piston rod sealingly guided out of the open end of the cylinder;
    a compression spring in the closed end of the cylinder;
    a cover closing the open end of the cylinder; and
    a guide bushing arranged in the chamber at the open end of the cylinder and guiding the piston rod, said guide bushing having a central shaft part of reduced outer diameter, a first widened end part supported on said conically-shaped annular flange and a second frusto-conically widened end part that engages into a complementary borehole in said cover, said shaft part being positioned between said first and second widened end parts and enclosed by a tubular section part made of an elastic material.

2. The apparatus as set forth in claim 1, wherein the elastic material of said tubular section part is selected from the group consisting of cellular rubber, foam rubber and foamed elastomer plastic.

3. The apparatus as set forth in claim 1, wherein said cover includes a bush-shaped part with a borehole therein for passage of said piston rod, and a flange-shaped edge with which said cover is supported on an annular end face of said cylinder.

4. The apparatus as set forth in claim 1, wherein said second frusto-conically widened end part of said guide bushing is supported in said cover on an annular step.

5. The apparatus as set forth in claim 1, wherein an annular lip seal is held between an underside of said cover and said second widened end part of said bushing.

6. The apparatus as set forth in claim 1, wherein said guide bushing includes at said second widened end part a plurality of radial ribs that fit within said complementary borehole in said cover.

7. The apparatus as set forth in claim 6, wherein said plurality of ribs extend axially to engage with said elastic tubular section part.

8. The apparatus as set forth in claim 1, wherein said piston rod is supported on said piston by a flat head.

9. The apparatus as set forth in claim 8, wherein an end of said piston adjacent said flat head includes a transversely extending groove with an axial borehole which opens into a widened axial borehole in said piston.

10. The apparatus as set forth in claim 9, wherein said piston includes at least one radial borehole which connects said widened axial borehole to a widened piston section.

11. The apparatus as set forth in claim 8, wherein an end of said piston remote from said flat head forms a seating for said compression spring.

12. The apparatus as set forth in claim 8, wherein an end of said piston adjacent said flat head includes an annular groove into which an obliquely slit ring is inserted.

13. The apparatus as set forth in claim 1, wherein an inner diameter of each of said first and second widened ends and said central shaft part of said bushing is substantially equal.

14. The apparatus as set forth in claim 1, wherein said tubular section part lies completely between said first and second widened ends of said bushing.

\* \* \* \* \*